(12) United States Patent
Kailash et al.

(10) Patent No.: US 7,921,089 B2
(45) Date of Patent: Apr. 5, 2011

(54) FEATURE BASED DATA MANAGEMENT

(75) Inventors: Kailash Kailash, San Jose, CA (US); Lakshmaiah Regoti, Cumming, GA (US); Hariharan Ganapathy, Cumming, GA (US)

(73) Assignee: ZScaler, Inc., Santa Clara, CA (US)

( * ) Notice: Subject to any disclaimer, the term of this patent is extended or adjusted under 35 U.S.C. 154(b) by 445 days.

(21) Appl. No.: 12/178,783

(22) Filed: Jul. 24, 2008

(65) Prior Publication Data
US 2010/0023519 A1 Jan. 28, 2010

(51) Int. Cl.
*G06F 17/30* (2006.01)
(52) U.S. Cl. ............. 707/694; 726/5; 726/3; 707/663; 707/662; 707/704
(58) Field of Classification Search .......... 707/770, 707/662, 663, 694, 704, 783, 784, 786; 709/229; 726/1, 3, 5
See application file for complete search history.

(56) References Cited

U.S. PATENT DOCUMENTS

| | | | | |
|---|---|---|---|---|
| 4,839,640 A * | 6/1989 | Ozer et al. | ................ | 340/5.33 |
| 5,634,072 A * | 5/1997 | Allen et al. | ................ | 718/104 |
| 6,327,574 B1 * | 12/2001 | Kramer et al. | ............ | 705/14.66 |
| 6,389,420 B1 * | 5/2002 | Vahalia et al. | ................ | 1/1 |
| 6,523,066 B1 * | 2/2003 | Montroy et al. | ............ | 709/229 |
| 6,611,837 B2 * | 8/2003 | Schreiber | ................ | 1/1 |
| 6,731,625 B1 * | 5/2004 | Eastep et al. | ................ | 370/352 |
| 6,754,181 B1 * | 6/2004 | Elliott et al. | ................ | 370/252 |
| 6,823,328 B2 * | 11/2004 | Schreiber | ................ | 707/770 |
| 6,836,776 B2 * | 12/2004 | Schreiber | ................ | 1/1 |
| 6,909,708 B1 * | 6/2005 | Krishnaswamy et al. | .... | 370/352 |
| 7,350,226 B2 * | 3/2008 | Moriconi et al. | ................ | 726/1 |
| 7,363,650 B2 * | 4/2008 | Moriconi et al. | ................ | 726/1 |
| 7,434,257 B2 * | 10/2008 | Garg et al. | ................ | 726/21 |

(Continued)

FOREIGN PATENT DOCUMENTS
KR  10-2005-0106978 A  11/2005

OTHER PUBLICATIONS

PCT International Search Report and the Written Opinion, PCT/US2009/051658, Feb. 26, 2010, 11 pages.

(Continued)

*Primary Examiner* — Jean M Corrielus
(74) *Attorney, Agent, or Firm* — Clements Bernard PLLC; Lawrence A. Baratta, Jr.; Christopher L. Bernard

(57) ABSTRACT

Methods, systems, and apparatus, including computer program products, for data structure locking. In one aspect, a proper subset of variables of a set of variables in a data structure are received. An access privilege to modify variables in the data structure to administrator accounts is assigned. A first administrator access request to modify a variable in the proper subset of variables is received, and the access privilege to modify the variable in the proper subset of variables for the first administrator account. A second administrator access request to modify the variable in the proper subset of variables is received, and an access timer that expires after a time period is initiated; the access privilege is disabled for the first administrator account in response to expiration of the access timer; and the access privilege for the second administrator account is enabled in response to expiration of the access timer.

16 Claims, 5 Drawing Sheets

U.S. PATENT DOCUMENTS

| | | |
|---|---|---|
| 7,506,357 B1 * | 3/2009 | Moriconi et al. .................. 726/1 |
| 7,673,323 B1 * | 3/2010 | Moriconi .......................... 726/1 |
| 2002/0040441 A1 | 4/2002 | See et al. |
| 2002/0165929 A1 | 11/2002 | McLaughlin et al. |
| 2005/0015612 A1 | 1/2005 | You et al. |
| 2006/0230265 A1 | 10/2006 | Krishna |
| 2007/0250700 A1 | 10/2007 | Sidhu et al. |
| 2008/0120693 A1 | 5/2008 | Beilinson et al. |

OTHER PUBLICATIONS

PCT International Search Report and the Written Opinion, PCT/US2009/051676, Feb. 25, 2010, 10 pages.

* cited by examiner

FEATURE BASED DATA MANAGEMENT

BACKGROUND

This disclosure relates to data structure management.

Security systems enforce enterprise defined policies. These policies can, for example, define rules to ensure regulatory compliance, defense against malware, improved productivity, and optimized use of network bandwidth. The policies also define permitted users and user roles, the latter of which define the access permissions of the permitted users. The policy data can be modified by users having administrative access privileges, i.e., administrators. Often there are multiple administrators, each having particular responsibilities for functional areas, e.g., a human resources administrator, and information technology administrator etc. Policies are refined when better security practices are found, when new employees are hired or existing employees leave or migrate into a different division of the company, or employee roles change.

Policies cover multiple functional areas and may be defined and modified by multiple administrators. Regardless of the number of administrators involved in a modification, correct and intended changes must be captured in the systems. This is commonly achieved in existing systems through the use of database locks. An administrator can acquire a lock on a database until the administrator completes the configuration change, which results in a new compilation of the policy data. All other administrators must wait for the completion of the modification by the first administrator, however. Thus administrators of the same enterprise modifying two distinct functional areas must sequentially modify the configuration. Accordingly, the coordination of work across functional areas becomes difficult.

SUMMARY

In general, one aspect of the subject matter described in this specification can be embodied in methods that include the identifying a proper subset of variables of a set of variables in a data structure; assigning an access privilege to modify variables in the data structure to administrator accounts; receiving a first administrator access request to modify a variable in the proper subset of variables; in response to receiving the first administrator access request, enabling the access privilege to modify the variable in the proper subset of variables for the first administrator account; receiving a second administrator access request to modify the variable in the proper subset of variables; in response to receiving the second administrator access request: initiating an access timer that expires after a time period, disabling the access privilege for the first administrator account in response to expiration of the access timer, and enabling the access privilege for the second administrator account in response to expiration of the access timer. Other features, objects, and advantages of the invention will be apparent from the description and drawings, and from the claims.

One or more of the following optional advantages can be realized by the aspects herein. Multiple administrators may operate concurrently on a data structure. The operations can be serialized and subsequently persisted to a data store, such as a data base, by a serialization manager. The data structure can be implemented as an abstraction of the data store, and thus the data store can be managed by conventional locking schemes during the serialized processing. When conflicts for operations on the same data variables in the data structure occur, a time can be initiated to time out a current administrator exercising an access privilege to the data structure so that multiple changes can be facilitated in a timely manner. Other optional advantages can also be realized.

The details of one or more embodiments of the subject matter described in this specification are set forth in the accompanying drawings and the description below. Other features, aspects, and advantages of the subject matter will become apparent from the description, the drawings, and the claims.

DESCRIPTION OF DRAWINGS

Like reference symbols in the various drawings indicate like elements.

DETAILED DESCRIPTION

Figure 1:
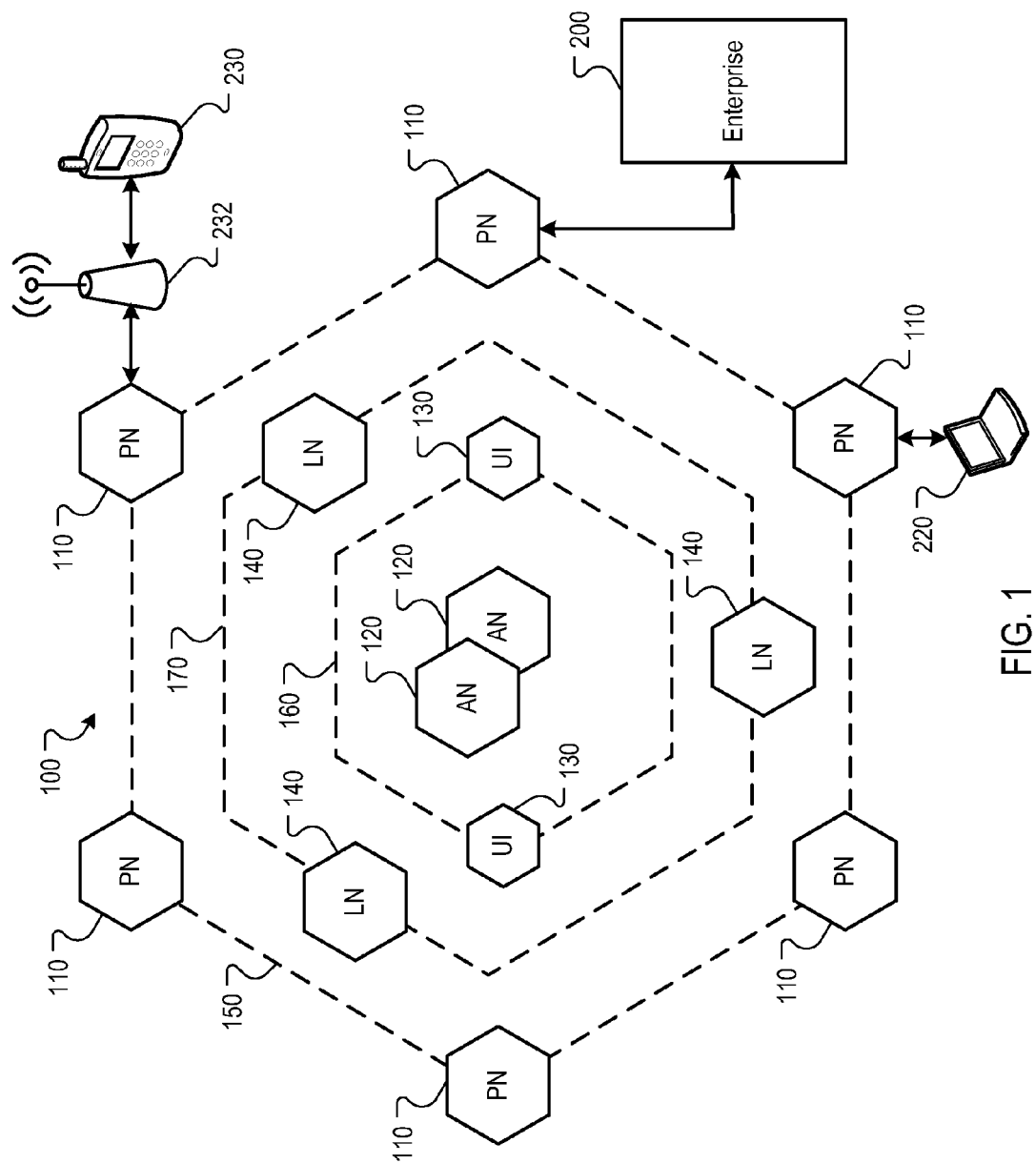
FIG. 1 is a block diagram of a distributed security system.

FIG. 1 is a block diagram of a distributed security system 100. The system 100 can, for example, be implemented as an overlay network in a wide area network (WAN), such as the Internet. The system 100 includes content processing nodes 110 that detect and preclude the distribution of security threats, e.g., malware, spyware, and other undesirable content sent from or requested by an external system, and can that can also facilitate parallel updates to policy data using feature based locking. Example external systems can include an enterprise 200, a computer device 220, and a mobile device 230, or other network and computing systems.

§1.0 Example High Level System Architecture

In an example implementation, each processing node 110 can include a decision system, e.g., data inspection engines that operate on a content item, e.g., a web page, a file, an e-mail message, or some other data or data communication that is sent from or requested by one of the external systems. In some implementations, all data destined for or received from the Internet is processed through a processing node 110. In other implementations, specific data specified by each external system, e.g., only e-mail, only executable files, etc., is process through a processing node 110.

Each processing node 110 can be implemented by a plurality of computer and communication devices, e.g., server computers, gateways, switches, etc. In some implementations, the processing nodes 110 can serve as an access layer 150. The access layer 150 can, for example, provide external system access to the security system 100. In some implementations, each processing node 110 can include Internet gateways and a plurality of server computers, and the processing nodes 110 can be distributed through a geographic region, e.g., throughout a country. According to a service agreement between a provider of the system 100 and an owner of an external system, the system 100 can thus provide security protection to the external system at any location throughout the geographic region.

Data communications can be monitored by the system 100 in a variety of ways, depending on the size and data requirements of the external system. For example, an enterprise 200 may have multiple routers that are used to communicate over the Internet, and the routers may be configured to establish communications through the nearest (in traffic communication time) processing node 110. A mobile device 230 may be configured to communication to a nearest processing node 110 through any available wireless access device, such as an access point, or a cellular gateway. A single computer device 220, such as a consumer's personal computer, may have its browser and e-mail program configured to access the nearest processing node 110, which, in turn, serves as a proxy for the computer device 220. Alternatively, an Internet provider may have all of its customer traffic processed through processing nodes 110.

In some implementations, the processing nodes 110 can communicate with one or more authority nodes 120. The authority nodes 120 can store publishing policy data for each external system and can distribute the policy data to each processing node 110. The policy data can, for example, define policies for an enterprise, e.g., administrative policies for the enterprise 200. Example policy data can define access privileges for users, benefits data, restricted domains, etc. The authority nodes 120 can distribute the policy data to the process nodes 110.

In some implementations, each authority node 120 can be implemented by a plurality of computer and communication devices, e.g., server computers, gateways, switches, etc. In some implementations, the authority nodes 110 can serve as an application layer 160. The application layer 160 can, for example, manage and provide policy data and data inspection engines and dictionaries for the processing nodes.

Other application layer functions can also be provided in the application layer, such as a user interface front-end 130. The user interface front-end 130 provides a user interface through which users of the external systems can provide and define policies, e.g., whether e-mail traffic is to be monitored, which groups of individuals in an enterprise receive a pay increase, etc.

Another application capability that can be provided through the user interface front-end 130 is security analysis and log reporting. The underlying data on which the security analysis and log reporting functions operate are stored in logging nodes 140, which serve as a data logging layer 170. Each logging node 140 can store data related to security operations and network traffic processed by the processing nodes 110 for each external system. Additionally, each logging node 140 can perform statistical operations and analysis on the data stored at the node and/or observed by the node 140.

In some implementations, the processing node 110 may act as a forward proxy that receives user requests to external servers addressed directly to the processing node 110. In other implementations, the processing node 110 may access user requests that are passed through processing node 110 in the transparent mode. A policy system, e.g., enterprise 200, can, for example, choose one or both of these modes.

§2.0 Example Detailed System Architecture And Operation

Figure 2:
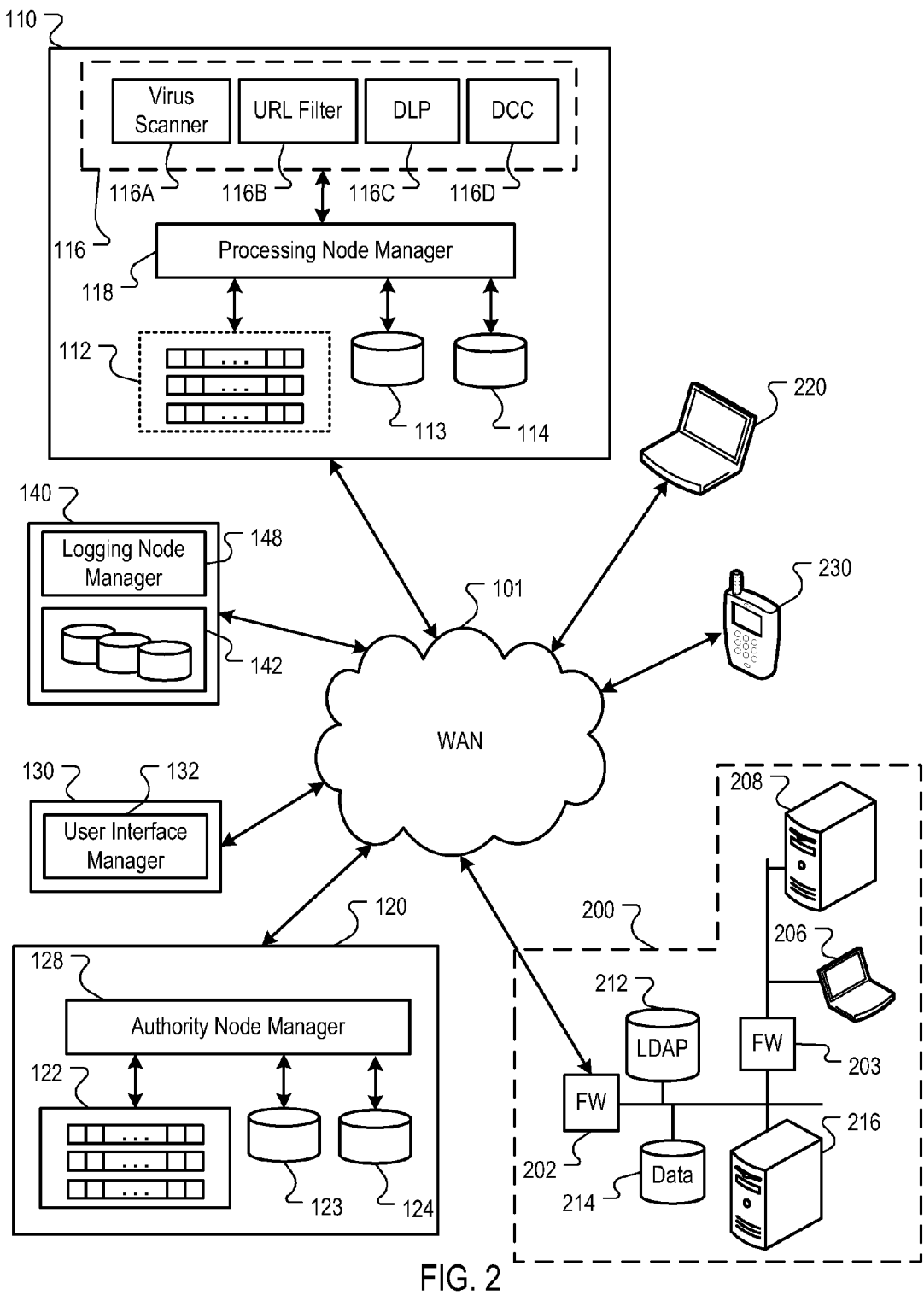
FIG. 2 is a block diagram of the system of FIG. 1 in which the components of FIG. 1 are illustrated in more detail.

FIG. 2 is a block diagram of the system of FIG. 1 in which the components of FIG. 1 are illustrated in more detail. Although only one representative component processing node 110, authority node 120 and logging node 140 are illustrated, there can be many of each of the component nodes 110, 120 and 140 present in the system 100.

A wide area network (WAN) 101, such as the Internet, or some other combination of wired and/or wireless networks, connects in data communication the processing node 110, authority node 120 and logging node 140. The external systems 200, 220 and 230 likewise communicate over the WAN 101 with each other or other data providers and publishers. Some or all of the data communication of each of the external systems 200, 220 and 230 can be processed through the processing node 110.

FIG. 2 also shows the enterprise 200 in more detail. The enterprise 200 can, for example, include a firewall 202 protecting an internal network that can include one or more enterprise servers 206, a lightweight director access protocol (LDAP) server 212, and other data or data stores 214. Another firewall 203 can protect an enterprise subnet that can include user computers 206 and 208 (e.g., laptop and desktop computers). The enterprise 200 may communicate with the WAN 101 through one or more network devices, such as a router, gateway, etc. The LDAP server 104 may store, for example, user login credentials for registered users of the enterprise 200 system. Such credentials can include a user identifiers, login passwords, and a login history associated with each user identifier. The other data 214 can include sensitive information, such as bank records, medical records, trade secret information, or any other information warranting protection by one or more security measures.

The computer device 220 and the mobile device 230 can also store information regarding organization policies, such as employee records, medical information, and administrator account information, e.g., administrator account information for the server 216 of the enterprise 200, or for some other restricted access data provider server.

§2.1 Example Processing Node Architecture

In some implementations, the processing nodes 110 are external to network edges of the external systems 200, 220 and 230. Each processing node 110 stores policies 113 received from the authority node 120 and monitors data structure variables requested by or sent from the external systems 200, 220 and 230. In some implementations, each processing node 110 can also store a policy process filter 112 and/or privilege access data 114 to facilitate the decision of whether a data structure variable should be modified according to access privileges of the requesting administrator account.

A processing node manager 118 can manage each content item in accordance with the policy data 113, and the policy process filter 112 and/or privilege access data 114, if stored at the processing node 110, so that policy changes for a plurality of external systems in data communication with the processing node are implemented external to the network edges for each of the external systems 200, 220 and 230. For example, depending on the access privilege for the change to the data structure variable in the policy data 113, the data structure variable change can be allowed or rejected. In general, data structure variables that are requested to be modified by an administrative account with access privileges are allowed, while modifications requested by an administrative account without access privileges can be precluded.

One way to manage conflicts in data is to lock portions of the data before a conflict occurs. These locks can be managed according to a lock interval. A read lock can allow subsequent requests to read, but not edit, the data in the parent nodes until access to the node from the initial request ends. A write exclusive lock can deny requests to read or edit data in the requested node and child nodes until access to the node from the initial request ends. Other locks can also be used. The authority nodes 120 can determine locks on data structure variables in the policy data. Locks can be issued for a fixed duration, e.g., a lock interval. The lock interval can be initiated by a timing module in an authority node manager 128. During the lock interval, if the current lock is shared, e.g., a read lock, then another shared lock request can be successful. If the current lock is shared and a request for an exclusive lock comes, e.g., a write exclusive lock, then the exclusive lock may be granted only at the expiration of the current lock interval. If the current lock is exclusive, then any lock request may be granted at the expiration of the current lock interval. For example, the timing module can alert the authority node 120 that the timer has expired, allowing the authority node 120 to grant the next request. If there are no lock requests at the expiration of an interval, then lock can be updated automatically for another interval.

The processing node 110 can include data inspection engines 116. Each data inspection engine 116 can be configured to perform a threat detection process to classify content items according to a threat classification for a corresponding threat. For example, the data inspection engines can include a virus scanner engine 116A that can classify a content item as infected or clean, a network URL filter 116B that can classify a URL address as allowed or restricted, a data leakage protection (DLP) engine 116C that can identify a content item as secure or leaking, and a dynamic content categorization (DCC) engine 116D that can classify a content item as passed or failed. The allowance of content according to its classification can be specified in the policy data 113.

§2.2 Example Authority Node Architecture

In general, the authority node 120 includes a data store that stores master security policy data 123 for each of the external systems 200, 220 and 230. An authority node manager 128 can be used to manage the master security policy data 123, e.g., receive input from users of each of the external systems defining different security policies, and can distribute the master security policy data 123 to each of the processing nodes 110. The processing nodes 110 then store a local copy of the security policy data 113.

The authority node 120 can also store a master policy process filter 122. The policy processing filter 122 can include data indicating whether data structure variables have been processed by one or more of the data inspection engines 116 in any of the processing nodes 110. The authority node manager 128 can be used to manage the master policy processing filter 122, e.g., receive updates from a processing nodes 110 when a processing node 110 has processed a data structure variable and update the master policy processing filter 122. In some implementations, the master policy processing filter 122 can be distributed to the processing nodes 110, which then store a local copy of the policy processing filter 112.

The authority node 120 can also store master access privilege data 124. The master access privilege data 124 can classify data structure variables by administrative account access privileges, e.g., which administrative accounts have access to a particular variable. The authority node manager 128 can be used to manage the master access privilege data 124, e.g., receive updates from a processing nodes 110 when a processing node 110 has processed a content item and update the master access privilege data 124 with any pertinent results. In some implementations, the master access privilege data 124 can be distributed to the processing nodes 110, which then store a local copy of the access privilege data 114.

§2.3 Example Processing Node and Authority Node Communications

The processing node 110 and the authority node 120 can be configured according to one or more push and pull processes to manage content items according to policy data 113 and/or 123, policy process filters 112 and/or 122, and the access privilege data 114 and/or master access privilege data 124.

The data inspection engines 116, processing node manager 118, authority node manager 128, user interface manager 132 and the logging node manager 148 can be realized by instructions that upon execution cause one or more processing devices to carry out the processes and functions described above. Such instructions can, for example, comprise interpreted instructions, such as script instructions, e.g., JavaScript or ECMAScript instructions, or executable code, or other instructions stored in a computer readable medium. Other processing architectures can also be used, e.g., a combination of specially designed hardware and software, for example.

§3.0 Feature Based Data Management

Figure 3:
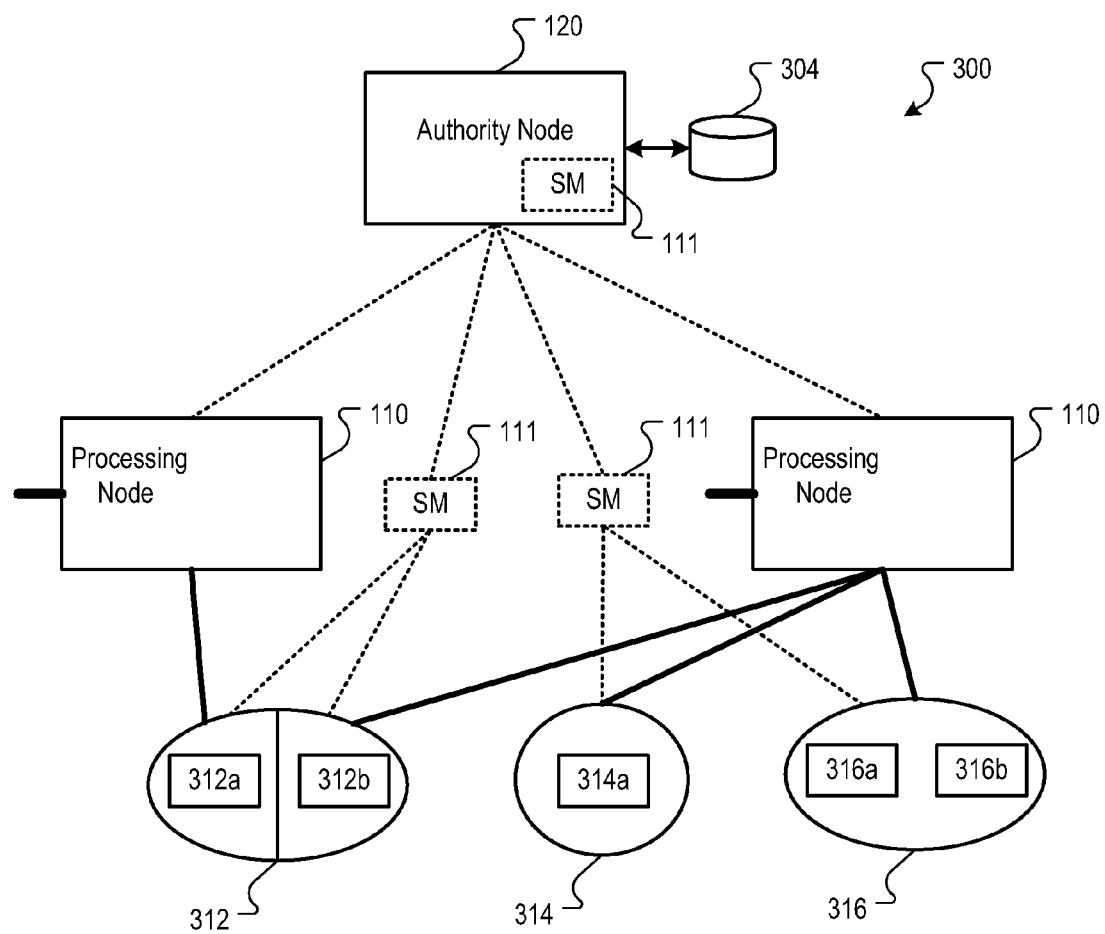
FIG. 3 is a block diagram of a feature based data structure locking architecture.

FIG. 3 is a block diagram of a feature based data structure locking architecture. The architecture 300 includes an authority node 120, a data structure 304, processing nodes 110, logging nodes 110, and enterprises 312, 314, 316. The architecture 300 can separate the control traffic and data traffic as shown FIG. 3 by use of dashed lines for control traffic and bold lines for data traffic. In some implementations, the authority node 120 can serialize modification requests for a data structure arriving over the network, e.g., by use of a serialization manager 121. The authority node 120 can persist the changes to a data store 304. In some implementations, the data structure can be implemented as an abstraction of a data store 304, and thus the data store can be managed by conventional locking schemes during the serialized processing.

In some implementations, the processing node 110 can instead include a serialization manager 111. In other implementations, the serialization manager 121 can be implemented as a separate node. The processing node 120 can receive a configuration state from the data store 304 through the authority node 120. The serialization manager 111 can facilitate changes to the configuration of the data structure from administrator accounts 312a-b, 314a, 316a-b associated with respective enterprises 312, 314 and 316. Each enterprise 312, 314 and 316 may have multiple locations, as illustrated by the central line in the enterprise 312.

In some implementations, the enterprises 312, 314 and 316 can be connected to different process nodes 110 for data services. In these implementations, control data regarding modifications to policy data for an enterprise can be communicated to the respective serialization managers 111 in each processing node. In other implementations, control traffic related to policy changes for an enterprise may be processed by a single serialization manager 111.

The serialization manager 111 can receive a request to change a configuration entity of an enterprise policy from an administrator account 312a-b, 314a, and 316a-b. Several administrator accounts 312a-b, 314a, 316a-b of the same enterprise 312, 314, and 316 may send the configuration change requests. The serialization manager 111 can manage the configuration requests such that the intended changes are captured and stored in the data store 304 to be applied to the process nodes 110.

Three enterprises 312, 314, 316 are shown connected to the system in FIG. 3. Enterprise 312 is shown with two physical locations each having a single administrator account 312a-b. Both administrator accounts 312a-b of the enterprise 312 connects to the same serialization manager 111 for updating enterprise configuration in FIG. 3.

Administrator accounts 312a-b, 314a, 316a-b can send commands regarding changes to variables within a data structure to the serialization managers 111. Commands may be to READ, UPDATE or CREATE a configuration entity. The user interface can provide an EDIT button which distinguishes the type of operation such as READ only or READ and WRITE. Accordingly, appropriate locks may be provisioned by the serialization manager 111. The serialization manager 111 can maintain a configuration map to provide parent child relationship among configuration entities (organization, functional module, rule collection etc). For each serialization manager 111 maintained configuration entity, its edit status is maintained.

Between a user interface agent and the serialization manager 111, the relational nature of the data can be preserved. For example, all relations are present only in the serialization manager 111. The serialization manager 111 can compile the changes into binary large objects (BLOBs) and assert BLOB instances to the data store 304 through the authority node 120. A BLOB is a mechanism by which the number of tables that are needed can be reduced. Configuration change is a small binary set which authority nodes 120 can communicate to processing nodes 110.

In the example implementation of FIG. 3, the configuration requests originate from an administrative user interface that sends commands to a central authority node 120 through the processing node. The authority node 120 can perform an update of the data structure. As the authority node 120 can access all the user transactions, it can serialize requests to avoid a lock remaining on a data structure variable for an extended period of time, e.g. five minutes. The authority node 120 can also send notifications to administrator accounts 312a-b, 314a, and 316a-b. In some implementations, different features may have different periods of time. For example, one feature may have a period of time set for three minutes, while another feature may have a period of time set for 30 seconds. In other implementations, all periods of time may be set to one particular period of time, e.g. one minute.

Figure 4:
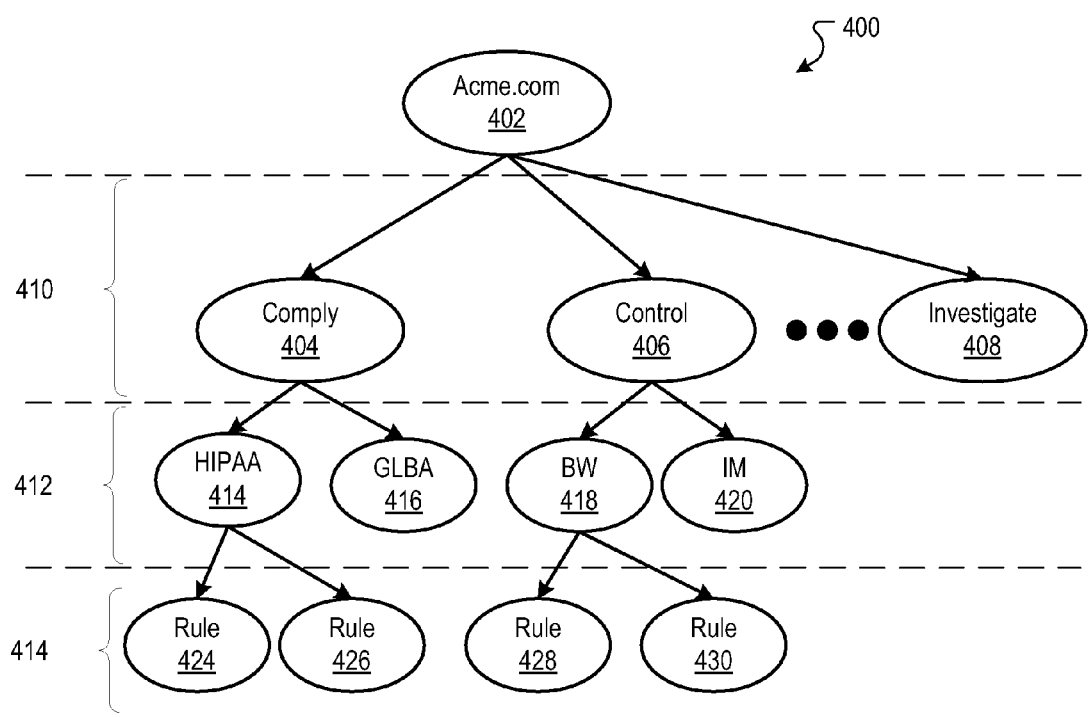
FIG. 4 is an exemplary data structure 400 that facilitates a feature based lock hierarchy.

FIG. 4 is an exemplary data structure 400 that facilitates a feature based lock hierarchy. A first node 402 is the parent node to a subset in the data structure. The data structure includes numerous variables, represented in FIG. 4 as being grouped in nodes. As shown, feature nodes 404, 406 and 408 of the first node 402 have policy nodes 412 associated as children within the lock hierarchy. Each policy node 414, 416, 418 and 420 has associated rules 422. There are various proper subsets within the data structure 400. For example, a proper subset can include HIPAA 414 and its children Rule 424 and Rule 426. Another proper subset can include Comply 404, HIPAA 414 and its children Rule 424 and Rule 426, and GLBA Policy 416. A rule may also be a proper subset, as each rule can have one or more variables and children (not shown).

Each proper subset of variables in a data structure can have an identifier, as can each administrator account. A proper subset can also have a version number that may be incremented by modification or by a request for a modification on the proper subset. This version number can be used to prevent collisions between administrator account requests. For example, if an administrator account is used to request a modification of a proper subset, e.g., by requesting that changes to the proper subset be persisted, the serialization manager 111 in FIG. 3 can determine whether the administrator account has received a write exclusive lock. If the administrator account has not received the write exclusive lock, the serialization manager 111 may require that the modifications not be persisted until the administration account receives a write lock privilege.

The serialization manager 111 can determine if a change has been made to the proper subset using the version number. Each proper subset can be associated with a version number. If an administrator account requests access to modify a proper subset, the version number associated with the proper subset can be changed to reflect a new version. In situations of collision, the version number can provide data to the serialization manager 111 so that data is not accidentally overwritten or lost. For example, a version number for a proper subset may be N. If a first administrator account requests access to a proper subset, the version number may be incremented to N+1. If a second administrator account requests access to the same proper subset, the access timer may expire, disabling the first administrator account's access. If the serialization manager 111 enables the second administrator account access from the expired timer, the version number can be incremented to N+2. In the course of actions on a data structure, the first administrator account may attempt to provide its version of the proper subset (N+1) serialization manager 111. The serialization manager 111 can compare this version number to the stored version number of the proper subset in the data structure and determine that it is not the most recent version. In some implementations, the first administrator account's request to change the proper subset can fail. Likewise, the request can also be returned to the first administrator account.

As shown in FIG. 4, the Comply 404, Control 406, Investigate 408 features can be modified in parallel. Likewise, the HIPAA Policy 414, GLBA Policy 416, Bandwidth Control 418, and IM control 420 can be modified in parallel. In some implementations, nodes may be related to the same rule 424, 426, 428 and 430. For example, Bandwidth Control 418 and Comply 404 may both be related to a rule regarding employee status, such as full-time and part-time status of employees. Such relationships can be maintained in a configuration map of the data structure. If a request for the employee status rule, then both Bandwidth Control 418 and Comply 404 may be read locked for the employee status rule's editing.

Modification of a proper subset can occur after access privileges of an administrator account are enabled for that proper subset. In some instances, the request may be denied because an administrator account does not have access privileges to a portion or all of the proper subset. For example, an administrator account may have access privileges to modify variables associated with the HIPAA Policy 414, but not the GLBA Policy 416. Therefore, if the administrator account requests to modify a proper subset including Comply 404, the administrator account may be denied.

In some implementations, a first administrator account may be enabled to modify the proper subset, and a second administrator account may request access to modify a variable belonging to the proper subset. In some implementations, the administrator accounts may request to modify the same variable. In other implementations, the administrator accounts may request to modify different variables in the same proper subset. In either situation, an access timer may be initiated to provide a time period that represents the longest amount of time that the first administrator account's access can remain enabled. Once the access timer expires, the first administrator account's access can be disabled and the second administrator account's access can be enabled. This can provide access to the second administrator if the first administrator account does not end enablement proactively, e.g., logging out.

If a request occurs to modify a node, the hierarchy can receive a command to place a read lock all parent entities and a write exclusive lock on all child entities. For example, if HIPAA Policy 414 is requested to be edited, Comply 404 and acme.com 402 may be read locked, while HIPAA Policy 414, Rule 424, and Rule 426 may be write exclusive locked. In some implementations, read locks can be shared, sibling nodes can be edited in parallel. For example, if HIPAA Policy 414 and GLBA Policy 416 were both requested for editing, both requests may also result in a read lock for Comply 404. Because a read lock may be shared, this does not cause a collision that preventing both requests from being enabled.

In some implementations, an exclusive write lock may be degraded to a read lock. For example, Control 406 can be selected for edit and its child, R1 430 can be edited. Initially, Control 406 and its children 418, 420, 428 and 430 can be locked with a write exclusive lock. If the edit becomes specified to rule 428, the write exclusive locks at Control 406 and Bandwidth Control 418 can be downgraded to read locks, while the write exclusive lock on Rule 430 can be removed.

In a lock hierarchy with more than one administrative account, multiple administrative accounts may request to edit the same node. If two administrative accounts request to modify the same variable in a node, such as R1 428, one of them can obtain the write exclusive lock to R1 428. In some implementations, once the first lock interval is expired, the other administrative account can automatically obtain a write exclusive lock. In other implementations, the other administrative account may receive notification that the node is available for editing.

Figure 5:
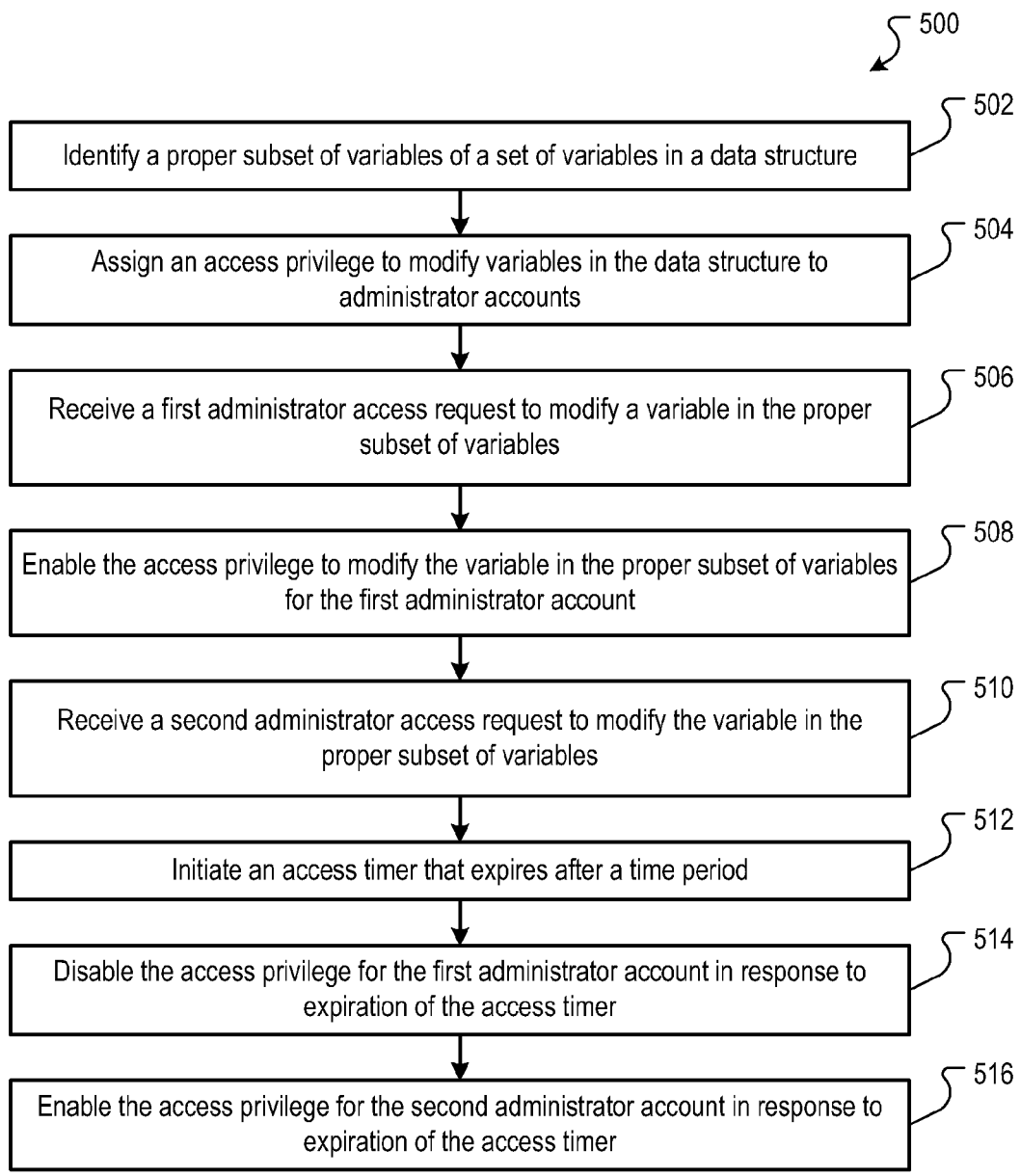
FIG. 5 is a flow diagram of an example process for providing access to the same variables for multiple administrators.

FIG. 5 is a flow diagram of an example process for providing access to the same variables for multiple administrators. The process 300 can, for example, be used in a lock hierarchy 400 of FIG. 4 or the feature based data structure locking architecture 300 of FIG. 3.

The process 500 identifies a proper subset of variables of a set of variables in a data structure (502). For example, the proper subset of control 406 and its children 418, 420, 428 and 430 can be identified by the authority node manager 128 that implements a serialization manager 111.

The process 500 assigns an access privilege to modify variables in the data structure to administrator accounts (504). For example, access privileges for control 406 can be assigned administrator accounts 312a and 314b.

The process 500 receives a first administrator access request to modify a variable in the proper subset of variables (506). For example, a request to modify Bandwidth Control 418 sent by the administrator account 312a can be received by the serialization manager 111.

The process 500 enables the access privilege to modify the variable in the proper subset of variables for the first administrator account (508). For example, administrator account 312a can have its access privilege enabled by the serialization manager 111.

The process 500 receives a second administrator access request to modify the variable in the proper subset of variables (510). For example, a second request to modify Bandwidth Control 418 sent by the administrator account 314b can be received by the serialization manger manager 111.

The process 500 initiates an access timer that expires after a time period (512). For example, once the serialization manager 111 receives administrator account 314b request, an access timer can begin, expiring after a predetermined amount of time. The amount of time may be, for example, one, two, or five minutes. The access timer can be implemented in the serialization manager 111, authority node manager, or processing node manager, depending on the implementations of the serialization manager.

The process 500 disables the access privilege for the first administrator account in response to expiration of the access timer (514). For example, the serialization manager 111 may disable the access privilege for the administrator account 312a at the expiration of the access timer.

The process 500 enables the access privilege for the second administrator account in response to expiration of the access timer (516). For example, the serialization manger 111 can enable the access privilege for the administrative account 314b.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus.

A computer program (also known as a program, software, software application, script, or code) can be written in any form of programming language, including compiled or interpreted languages, or declarative or procedural languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Additionally, the logic flows and structure block diagrams described in this patent document, which describe particular methods and/or corresponding acts in support of steps and corresponding functions in support of disclosed structural means, may also be utilized to implement corresponding software structures and algorithms, and equivalents thereof. The processes and logic flows described in this specification can be performed by one or more programmable processors executing one or more computer programs to perform functions by operating on input data and generating output.

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD ROM disks. The processor and the memory can be supplemented by, or incorporated in, special purpose logic circuitry.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described is this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

This written description sets forth the best mode of the invention and provides examples to describe the invention and to enable a person of ordinary skill in the art to make and use the invention. This written description does not limit the invention to the precise terms set forth. Thus, while the invention has been described in detail with reference to the examples set forth above, those of ordinary skill in the art may effect alterations, modifications and variations to the examples without departing from the scope of the invention.

What is claimed is:

1. A computer-implemented method, comprising:
identifying a proper subset of variables of a set of variables in a data structure, wherein the set of variables are associated according to a lock hierarchy comprising a plurality of nodes, and wherein the proper subset of variables are the variables associated with a corresponding node in the lock hierarchy and all child nodes of the node in the lock hierarchy, and do not include variables associated with parent nodes of the node;
assigning an access privilege to modify variables in the data structure to administrator accounts;
receiving a first administrator access request to modify a variable in the proper subset of variables;
in response to receiving the first administrator access request:
enabling the access privilege to modify the variable in the proper subset of variables for the first administrator account
enabling a read lock for the parent nodes of the node in the hierarchy so that the parent nodes in the hierarchy can be accessed by other administrator accounts; and
imposing a write lock on the node and all child nodes of the node in the lock hierarchy so that only the first administrator has the ability to view contents of the node and all the child nodes;
receiving a second administrator access request to modify the variable associated in the proper subset of variables;
in response to receiving the second administrator access request:
initiating an access timer that expires after a time period;
disabling the access privilege for the first administrator account in response to expiration of the access timer; and
enabling the access privilege for the second administrator account in response to expiration of the access timer.

2. The method of claim 1, wherein imposing the write lock comprises enabling modification of the variables associated with the node and the child nodes of the node in the lock hierarchy only by the administrator account having access privilege enabled.

3. The method of claim 1, further comprising associating the node in the lock hierarchy and all child nodes of the node in the lock hierarchy with an administrative policy.

4. The method of claim 1, wherein the data structure includes a plurality of proper subsets of variables, each proper subset of variables being variables associated with a corresponding node in a lock hierarchy and all child nodes of the corresponding node, and further comprising associating each proper subset with its own access privileges.

5. The method of claim 4, wherein each proper subset has a lock policy separate from all other proper subsets, such that the first administrator account has access request enabled for a first proper subset and a second administrator account has access request enabled for a second proper subset.

6. The method of claim 1, wherein the data structure is representative of a database.

7. The method of claim 1, wherein the data structure is a database.

8. The method of claim 1, further comprising disabling the access privilege for an administrator account after a modification of the variable has entered through the administrator account.

9. The method of claim 1, further comprising:
assigning a version number for a version of the proper subset to which an administrator account has an access privilege enabled; and
comparing the version number to a most recent version number assigned to the proper subset; and
allowing the modification to the variable in the proper subset if the version number of the proper subset to which the variable belongs matches the most recent version number.

10. The method of claim 9, further comprising:
preculding the modification to the variable in the proper subset if the version number of the proper subset to which the variable belongs does not match the most recent version number.

11. A system, comprising:
a logging node configured to receive a configuration state associated with a data store and to manage configuration requests from administrator accounts, each of the administrator accounts being associated with an access privilege determinative of which of the administrator accounts is used to modify a proper subset of variables in a data store, wherein the proper subset of variables are associated according to a lock hierarchy comprising a plurality of nodes, and wherein the proper subset of variables are the variables associated with a corresponding node in the lock hierarchy and all child nodes of the node in the lock hierarchy, and do not include variables associated with parent nodes of the node;
a configuration map mapping relationships between the nodes in the lock hierarchy and all child nodes of the nodes in the lock hierarchy of the data store;
an authority node configured to serialize requests from the administrator accounts by enabling the access privilege of a first administrator account to the proper subset of variables in the data store, enable a read lock for the parent nodes of the node in the hierarchy so that the parent nodes in the hierarchy can be accessed by other administrator accounts, and impose a write lock on the node and all child nodes of the node in the lock hierarchy so that only the first administrator account has the ability to view contents of the node and all the child nodes upon a first administrator account request and maintain enablement of the access privilege until a second administrator account request for the access privilege to the proper subset of variables is received; and
a timing module configures to initiate a timer in response to the second administrator account request, the timing module providing a signal to the authority node in response to an expiration of the timer that causes the authority node to disable the access privilege for the first administrator account and to enable the access privilege for the second administrator account.

12. The system of claim 11, wherein the logging node is associated with the authority node.

13. The system of claim 12, wherein the logging node is a functional module of the authority node.

14. The system of claim 11, further comprising enterprise locations containing one or more administrator accounts, each enterprise location with its own access privilege.

15. The system of claim 14, further comprising user interfaces, such that at least one enterprise location uses more than one of the user interfaces.

16. Software stored in a computer readable medium and comprising instructions executable by a processing node system, and in response to such execution causes the processing node system to perform operations comprising:
identifying a proper subset of variables of a set of variables in a data structure, wherein the set of variables are associated according to a lock hierarchy comprising a plurality of nodes, and wherein the proper subset of variables are the variables associated with a corresponding node in the lock hierarchy and all child nodes of the node in the lock hierarchy, and do not include variables associated with parent nodes of the node;
assigning an access privilege to modify variables in the data structure to administrator accounts;
receiving a first administrator access request to modify a variable in the proper subset of variables;
in response to receiving the first administrator access request:
enabling the access privilege to modify the variable in the proper subset of variables for the first administrator account,
enabling a read lock for the parent nodes of the node in the hierarchy, so that the parent nodes in the hierarchy can be accessed by other administrator accounts, and
imposing a write lock on the node and all child nodes of the node in the lock hierarchy so that only the first administrator has the ability to view contents of the node and all the child nodes;
receiving a second administrator access request to modify the variable associated in the proper subset of variables;
in response to receiving the second administrator access request:
initiating an access timer that expires after a time period;
disabling the access privilege for the first administrator account in response to expiration of the access timer; and
enabling the access privilege for the second administrator account in response to expiration of the access timer.

* * * * *